(12) United States Patent
Taglienti et al.

(10) Patent No.: US 7,885,636 B2
(45) Date of Patent: Feb. 8, 2011

(54) DATA PRE-PAID IN SIMPLE IP DATA ROAMING

(75) Inventors: Claudio Taglienti, Barrington Hills, IL (US); Narothum Saxena, Hoffman Estates, IL (US); Michael Irizarry, Algonquin, IL (US)

(73) Assignee: United States Cellular Corporation, Chicago, IL (US)

( * ) Notice: Subject to any disclaimer, the term of this patent is extended or adjusted under 35 U.S.C. 154(b) by 1362 days.

(21) Appl. No.: 11/344,332

(22) Filed: Jan. 31, 2006

(65) Prior Publication Data

US 2007/0179796 A1 Aug. 2, 2007

(51) Int. Cl.
*H04W 4/00* (2009.01)
(52) U.S. Cl. .................... 455/406; 455/405; 455/407; 455/408
(58) Field of Classification Search .......... 455/406–408
See application file for complete search history.

(56) References Cited

U.S. PATENT DOCUMENTS

| | | | |
|---|---|---|---|
| 5,691,981 A | 11/1997 | Weiss | |
| 6,137,791 A | 10/2000 | Frid et al. | |
| 6,741,687 B1 | 5/2004 | Coppage et al. | |
| 6,829,473 B2 | 12/2004 | Raman et al. | |
| 6,970,693 B2 * | 11/2005 | Madour et al. | 455/408 |
| 6,978,128 B1 | 12/2005 | Raman et al. | |
| 7,366,136 B1 * | 4/2008 | Kalbag et al. | 370/329 |
| 2004/0106393 A1 * | 6/2004 | Chowdhury et al. | 455/406 |
| 2004/0107360 A1 * | 6/2004 | Herrmann et al. | 713/201 |
| 2005/0177515 A1 * | 8/2005 | Kalavade et al. | 705/52 |
| 2005/0198277 A1 * | 9/2005 | Wada et al. | 709/224 |

OTHER PUBLICATIONS

3RD Generation Partnership Project 2 (3GPP2), "cdma2000 Wireless IP Network Standard: Introduction," X.S0011-001-C v1.0, Aug. 2003.
3RD Generation Partnership Project 2 (3GPP2), "cdma2000 Wireless IP Network Standard: Simple IP and Mobile IP Access Services," X.S0011-002-C v1.0, Aug. 2003.
Rigney, C., "RADIUS Accounting," RFC 2139, Apr. 1997.
Rigney, C., S.Willens, A. Rubens, and W. Simpson, "Remote Authentication Dial in User Services (RADIUS)," RFC 2865, Jun. 2000.
Rigney, C., "RADIUS Accounting," RFC 2866, Jun. 2000.
Rigney, C., W. Willats, and P. Calhoun, "RADIUS Extensions," RFC 2869, Jun. 2000.
Chiba, M., M. Elkund, D. Mitton, and B. Aboba, "Dynamic Authorization Extensions to Remote Authentication Dial in User Services (RADIUS)," RFC 3576, Jul. 2003.
3RD Generation Partnership Project 2 (3GPP2), "cdma2000 Wireless IP Network Standard: PrePaid Packet Data Services," X.S0011-006-C v2.0, Aug. 2005.
Hunter, A. "Packet Data Roaming." Apr. 18, 2005. PowerPoint available at http://cdg.org/news/events/CDMASeminar/05_LatinAm/op_roam_meeting/Packet%20Data%20Roaming.pdf (Last v.

* cited by examiner

*Primary Examiner* — Charles N Appiah
*Assistant Examiner* — Jaime M Holliday
(74) *Attorney, Agent, or Firm* — Leydig, Voit & Mayer, Ltd.

(57) ABSTRACT

The described embodiments of the present invention outline two solutions to the problems described above regarding simple IP data access for pre-paid subscribers. The first solutions includes a method for providing pre-paid simple IP data service to a subscriber in a network, including: sending an access request from a point of attachment in an access network capable of providing an IP network access to a home network remote authentication server which deploys a Pre-Paid Client (PPC) and receiving in the point of attachment an access request response from the home network remote authentication server. The second solution includes a method for providing pre-paid simple IP data service to a subscriber in a network, including: sending an access request from a Mobile Station (MS) which deploys a Pre-Paid Client (PPC) to a home network remote authentication server and receiving in the MS an access request response from the home network remote authentication server.

29 Claims, 5 Drawing Sheets

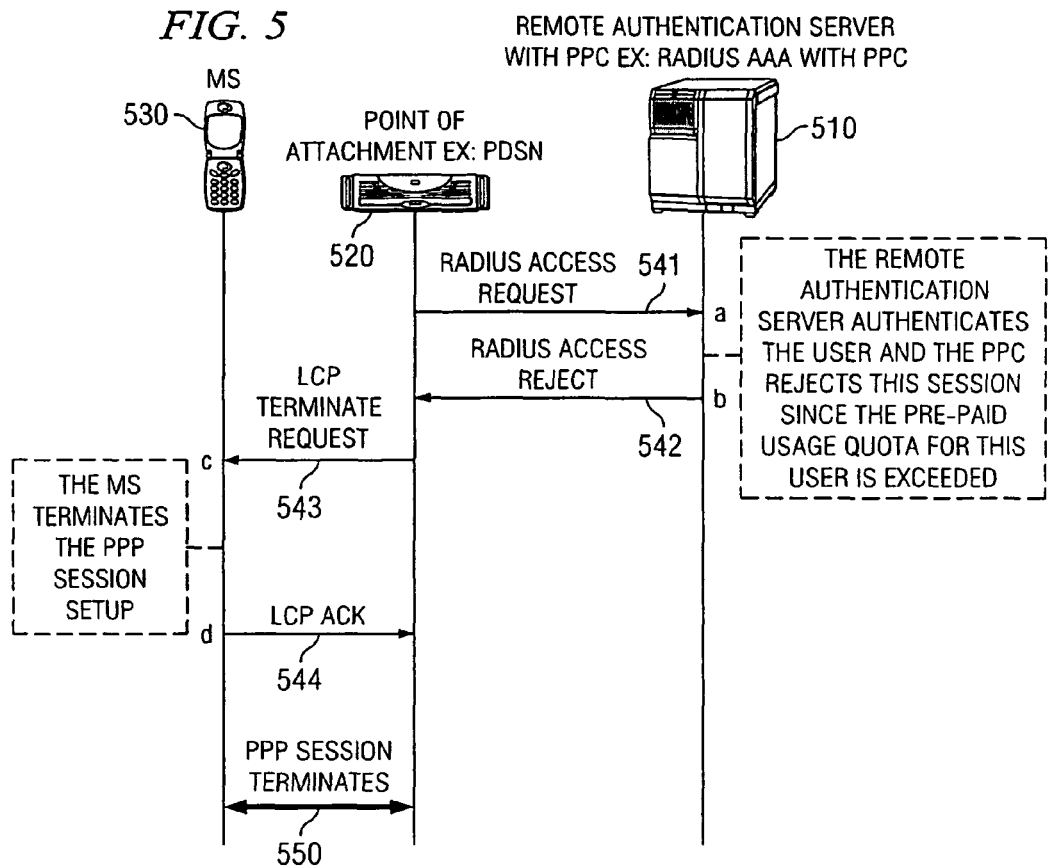
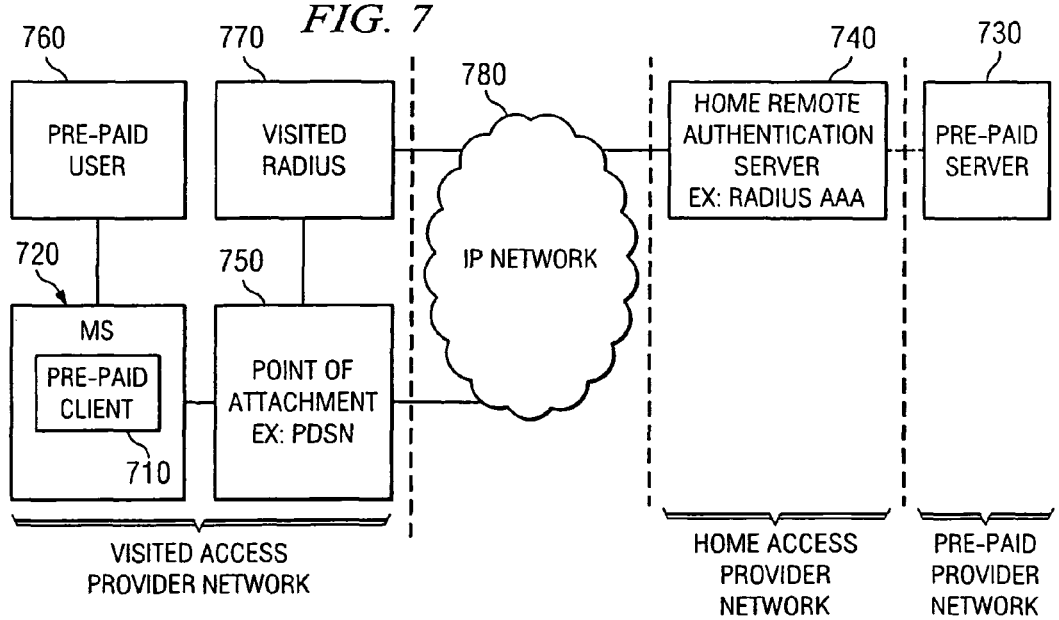

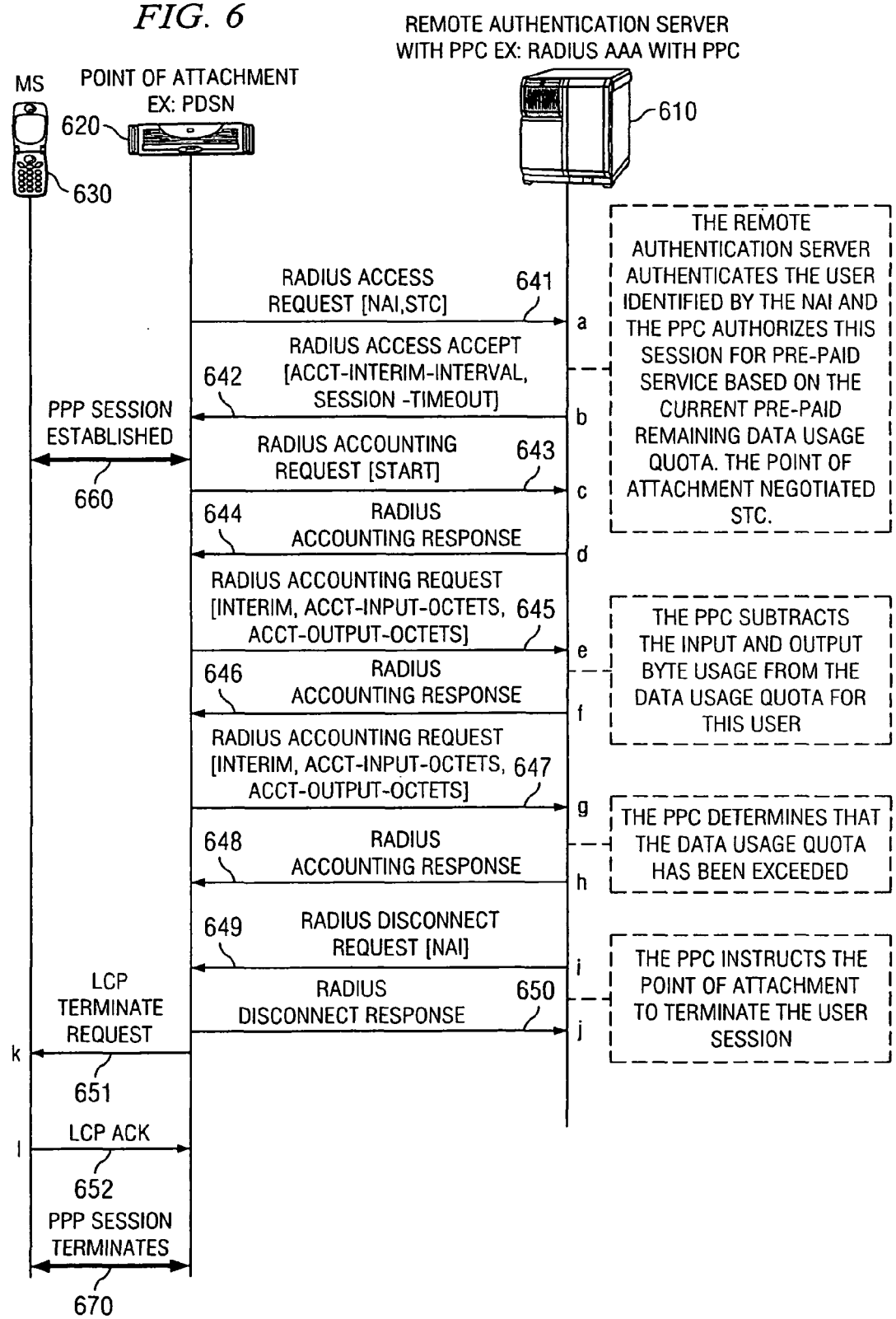

DATA PRE-PAID IN SIMPLE IP DATA ROAMING

FIELD OF THE INVENTION

The present invention relates to pre-paid simple IP data service. More specifically, the present invention relates to enabling access to simple IP data functionality for pre-paid data subscribers in a roaming scenario.

BACKGROUND OF THE INVENTION

TIA-835-B defines pre-paid data service in terms of pre-paid client (PPC) and pre-paid paid server (PPS) functionality. The client functionality is responsible for metering the data usage. The server functionality is based on authorizing pre-paid usage and provides quotas and thresholds for pre-paid functionality. In the scope of TIA-835-B, the PPC functionality for simple IP is implemented within the packet data service node (PDSN) element of a code division multiple access (CDMA) network.

There are several inherent problems with this implementation. For a roaming pre-paid paid subscriber to be able to access simple Internet Protocol (IP) service, the visited network must be a CDMA network, and in addition, the PDSN through which the pre-paid subscriber will access the internet must be capable of and enabled to support pre-paid functionality. If the PDSN does not have PPC functionality, then a pre-paid subscriber will not be able to access simple IP. A visited network may not be willing to allow roamers to utilize pre-paid functionality for various reasons, including the additional processing overhead incurred for such transactions.

Therefore, it is the purpose of this invention to enable pre-paid subscribers to have access to simple IP whether or not the visited network in which they are roaming supports pre-paid simple IP access.

In the context of this invention, there are some relevant terms that will be defined here. A packet data session describes continuous use of packet data service by the user. A packet data session begins when the user invokes a packet data service. A packet data session ends when the user or the network terminates the packet data service. For simple IP service, changing points of attachments constitutes a change in the packet data session because a new IP address is assigned by the new point of attachment. A point of attachment refers to the node where the Mobile Station (MS) is connected to access the IP network. For this invention, examples of points of attachment are PDSNs, GGSNs, WI-FI nodes, and WiMAX nodes. Mobile Station refers to equipment, such as a mobile phone, that is used by a user to access a wireless network. A pre-paid packet data service is a function that allows a user to pay in advance for the use of packet data service. A pre-paid server (PPS) is a function that manages pre-paid accounts for the users. It maintains the pre-paid accounts on a per user basis or on a per service type basis for a user. It communicates with the pre-paid client for control of the pre-paid packet data service. A pre-paid client (PPC) is a function that resides in the wireless IP network and communicates with the pre-paid server function (PPS) to control the prepaid user's packet data session. It requests pre-paid account authorization for a user and monitors the user's packet data session to determine when the limits of the authorization are reached.

SUMMARY OF THE INVENTION

The described embodiments of the present invention outline two solutions to the problems described above regarding simple IP data access for pre-paid subscribers. The first solution includes a method for providing pre-paid simple IP data service to a subscriber in a network, including: sending an access request from a point of attachment in an access network capable of providing an IP network access to a home network remote authentication server which deploys a Pre-Paid Client (PPC) and receiving in the point of attachment an access request response from the home network remote authentication server. The second solution includes a method for providing pre-paid simple IP data service to a subscriber in a network, including: sending an access request from a Mobile Station (MS) which deploys a Pre-Paid Client (PPC) to a home network remote authentication server and receiving in the MS an access request response from the home network remote authentication server.

SUMMARY OF THE DRAWINGS

The descriptions of the embodiments herein can be better understood in light of the drawings, wherein:

FIG. 5 is a diagram showing the message flow for the embodiment of the invention where the PPC is deployed in the remote authentication server wherein the pre-paid usage has been exceeded;

FIG. 6 is a diagram showing the message flow for the embodiment of the invention where the PPC is deployed in the remote authentication server wherein session termination capability is enabled and disconnect requests can be sent from the remote authentication server to the point of attachment;

FIG. 7 is a schematic diagram showing the pre-paid architecture with the PPC deployed within the mobile station.

DETAILED DESCRIPTION OF THE INVENTION

Figure 1:
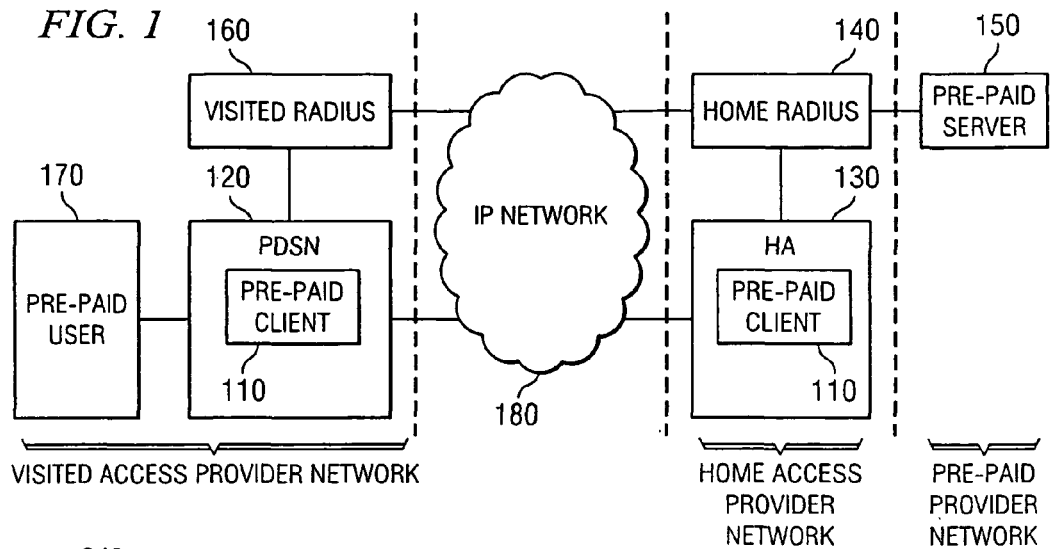
FIG. 1 is a schematic diagram showing the CDMA 2000 pre-paid architecture.

FIG. 1 shows the pre-paid architecture, as defined in Telecommunication Industry Association TIA-835-C (made available via the 3rd Generation Partnership Project 2 — 3GPP2), that enables a pre-paid user 170 to access the IP network 180. According to the specification, the pre-paid client (PPC) 110 resides in either the packet data service node (PDSN) 120 or the home agent (HA) 130. If the PPC 110 resides in the HA 130, then the HA 130 in combination with the home Remote Authentication Dial In User Service (RADIUS) server 140 determines whether to validate the pre-paid user's 170 access to pre-paid mobile IP services. The home RADIUS 140 is the RADIUS server that resides in the home IP network. If the PPC 110 is listed in the PDSN 120, then the PDSN 120 sends an access request message to the home RADIUS server 140, and in turn the home RADIUS server 140 determines whether to validate pre-paid mobile IP services. The home RADIUS server 140 may incorporate the pre-paid server (PPS) 150. The visited RADIUS server 160 is the RADIUS server that resides in the visited network.

Figure 2:
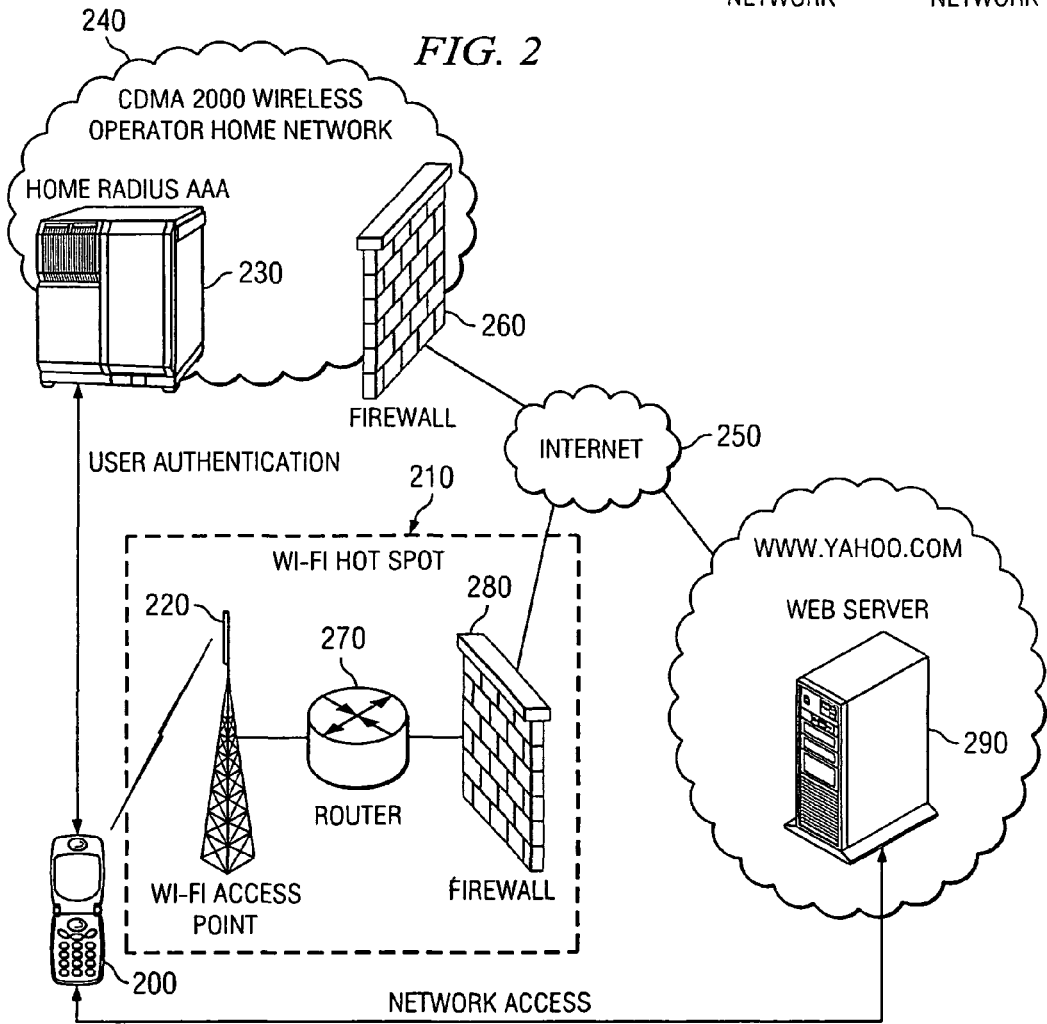
FIG. 2 is a schematic diagram showing a WI-FI hot spot roaming scenario.

The concept of a home agent (HA) is unique to mobile IP. There is no home agent (HA) element in a simple IP network. Therefore, in a simple IP network, the PPC would have to be located in the PDSN in order for a pre-paid subscriber to be able to access simple IP data in an access network. One problem with this is that this architecture does not support access networks that do not have a PDSN element. For example, a GSM, WI-FI or WiMAX access network could not be utilized by a pre-paid data user even if the home network is capable of authenticating this subscriber and the access network can provide network access to the internet. This is illustrated in FIG. 2 where the access network 210 is a WI-FI Hot Spot network and the role of the PDSN is played by the WI-FI access point 220. However the access point node does not support pre-paid functionality (PPC). The Home Radius AAA server 230 deployed in the home operator network 240, depicted here as a CDMA 2000 Wireless Operator Home Network, will perform authentication of the handset 200 and authorize the subscriber to access the WI-FI Hot Spot network 210 based on the subscriber given pre-paid usage quota. The Firewall 260 deployed in the home operator network 240 provides protection for the network elements deployed within the home operator network 240. The WI-FI access point 220 provides the point of attachment for the handset 200 in the WI-FI Hot Spot network 210. This network element connects to the handset 200 via wireless communications standards such as IEEE 802.11x type technologies. The WI-FI access point 220 provides security for the WI-FI Hot Spot network 210 such as WEP and/or WAP and could also perform local authentication for this subscriber before allowing the handset 200 to contact the Home Radius AAA server 230. The router 270 in the WI-FI Hot Spot network 210 provides IP routing functionality the allow the WI-FI Hot-Spot network 210 to connect to the internet 250. The Firewall 280 in the WI-FI Hot Spot network 210 provides protection for the network elements deployed within the WI-FI Hot Spot network 210. The Web Server 290 represents the end point of the communication this subscriber in involved in. In this example the user is accessing the "www.yahoo.com" web site.

Another data roaming scenario where pre-paid simple IP data users will be unable to access data services is in situations where the PDSN in the CDMA 2000 access network is unable to support pre-paid functionality. This is especially true for large CDMA 2000 wireless carriers that operate a large number of PDSNs in their network. These PDSNs are manufactured by different vendors and operate with different software loads. Not all PDSN vendors have this functionality implemented. Furthermore, even in situations where the pre-paid functionality is available on PDSNs, the wireless carrier in the access network might not want to enable this functionality for roamers. This may be due to the increase performance/resource overhead incurred by the PDSN and the network when supporting pre-paid functionality. This state of affairs would leave pre-paid simple IP data subscribers unable to access data services when roaming.

In the described embodiment of the present invention, an access network may be a visited network in which a subscriber is roaming, and it may also be a subscriber's home network. When the access network belongs to the home network and there are a large number of points of attachment that do not support pre-paid client functionality, then this embodiment can enable pre-paid users to have access to simple IP data services. Therefore, this invention can be employed in non-roaming scenarios as well.

The pre-paid functionality described in this patent relates to the bearer plane. This implies that any service or application deployed over such bearer would inherently be able to provide pre-paid functionality even if the service or application itself does not provide such functionality. No changes to elements in the visited network would be required, making it possible to implement this solution quickly and seamlessly.

Figure 3:
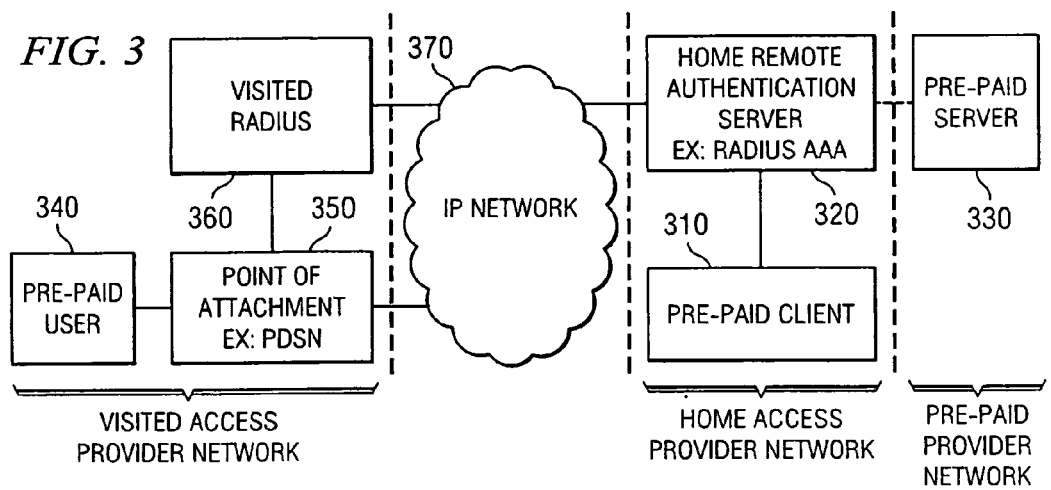
FIG. 3 is a schematic diagram showing the pre-paid architecture with the PPC deployed in the remote authentication server.

A first embodiment is illustrated in FIG. 3. In this embodiment of this invention, the home network remote authentication server 320 deploys the PPC 310 functionality. An example of a home network remote authentication server is a home RADIUS authentication, authorization, and accounting (AAA) server. The home network remote authentication server 320 incorporates the PPC 310 functionality. In addition, the home network remote authentication server 320 may incorporate the PPS 330 functionality as well. The pre-paid user 340 accesses the IP network 370 through the point of attachment 350 in the access network. The visited RADIUS server 360 is the RADIUS server that resides in the access network.

Figure 4:
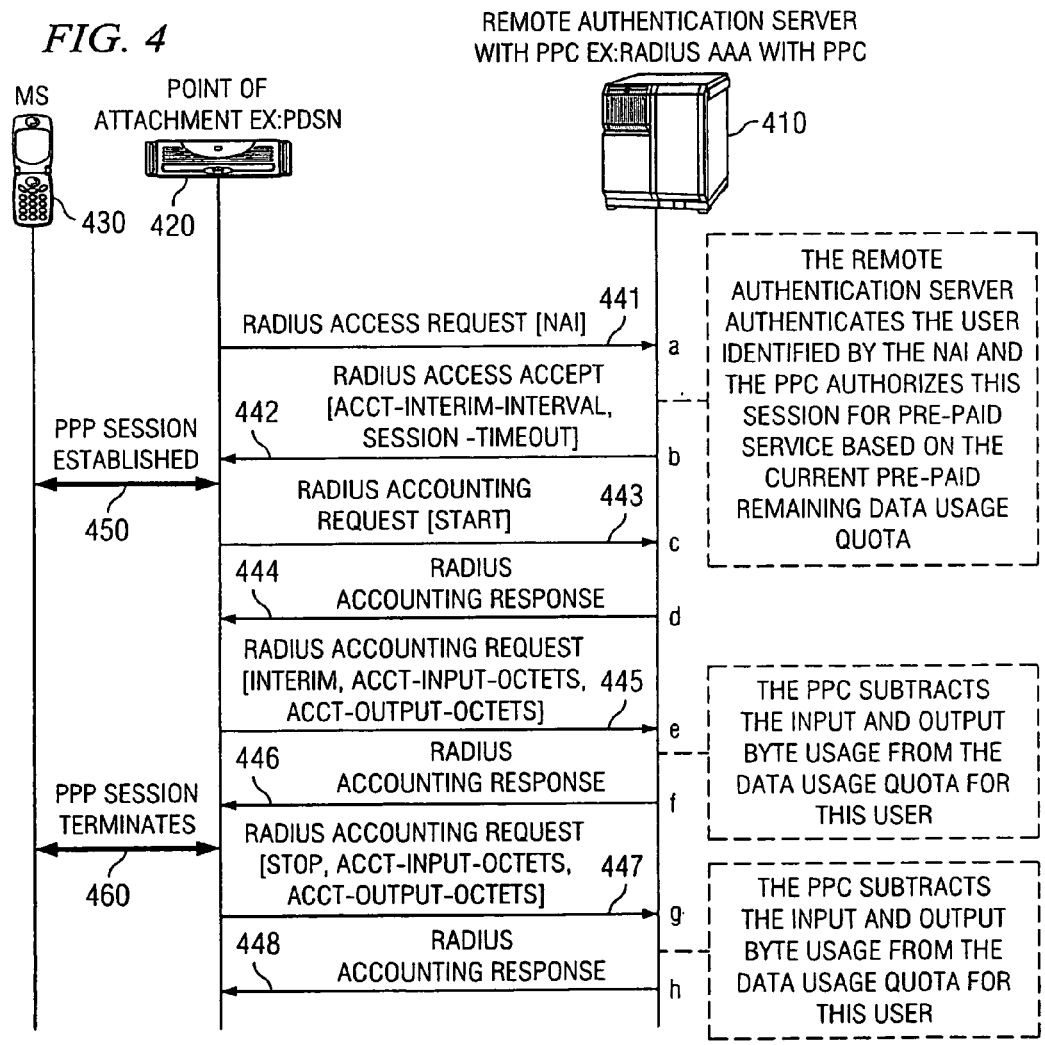
FIG. 4 is a diagram showing the message flow for the embodiment of the invention where the PPC is deployed in the remote authentication server.

An example of a message sequence according to the first embodiment of the invention is illustrated in FIG. 4, which shows a TIA-835-B message sequence diagram for RADIUS authorization and accounting messages. The accounting messages comply with RFC 2139 and RFC 2869 in the context of TIA-835-B. The new functionality being proposed by this invention is defined by the PPC element resident in the home network remote authentication server 410. In the context of this invention, the use case described in FIG. 4 is the "Volume usage until account depletion" use case. The PPC in the home network remote authentication server 410 will perform the data usage metering against a user specific pre-configured configured data usage quota. This quota defines the amount of data usage that a pre-paid user is allowed to consume based on his or her purchase.

In step a 441 in FIG. 4, the point of attachment 420 (eg., PDSN, WI-FI access point, Wi-MAX access point), which is the element in the access network that provides the connection for the mobile station (MS) 430 to the IP network, sends an access request to the home network remote authentication server 410. The access request contains a network access identifier (NAI). The home network remote authentication server 410 authenticates the user identified by the NAI, and the PPC, which is incorporated into the home network remote authentication server 410, authorizes this session for data usage based on the current pre-paid data usage quota.

In step b 442 in FIG. 4, the home network remote authentication server 410 sends to the point of attachment 420 an access request response in the form of an access request. The access request response contains information defining the interval for point of attachment transmission of interim accounting records (Acct-Interim-Interval [RADIUS type 85]) and the total length of this data session (Session-Timeout [RADIUS Type 27]) for this user.

If the access request response is an acceptance of service and not a rejection (which would be the case if the current prepaid subscriber has exceeded his pre-paid data usage limit), then a point-to-point protocol (PPP) session is established between the mobile station (MS) 430 and the point of attachment 420, as indicated by the bidirectional arrows 450 labeled "PPP Session Established."

In step c 443, the point of attachment 420 sends to the home network remote authentication server 410 an accounting request, and in step d 444, the home network remote authentication server 410 sends an accounting response to the point of attachment 420.

In steps e through h in FIG. 4, the PPC adjusts (subtracts data usage from the data quota) the data usage quota based on session reported data usage in the RADIUS Acct-Input-Octets and Acct-Output-Octets. When the interval for point of attachment transmission of interim accounting records has elapsed, the point of attachment 420 sends an accounting request to the home network remote authentication server 410, as illustrated in step e 445 of FIG. 4. The PPC then subtracts the input and output byte usage from the data usage quota for this prepaid user. In step f 446, the home network remote authentication server 410 sends an accounting response to the point of attachment 420.

When the PPP session is terminated, as indicated by the bidirectional arrows 460 labeled "PPP Session Terminates," the point of attachment 420 sends an accounting request to the home network remote authentication server 410, as illustrated in step g 447 of FIG. 4. The PPC then subtracts the input and output byte usage from the data usage quota for this prepaid user. In step h 448, the home network remote authentication server 410 sends an accounting response to the point of attachment 420.

Note that if the data usage quota is exceeded by a user during an active data session the system will continue to provide service to this user until the session is terminated. It is recommended that for pre-paid sessions the maximum session timeout (Session-Timeout [RADIUS Type 27]) be configured to be smaller for pre-paid users.

As already pointed out, this embodiment of the invention cannot terminate active user sessions that exceed the pre-paid data usage quota. The embodiment relies on the data session terminating based on the user or via the session timer expiring. The advantage of this implementation of the invention is the ability to operate with legacy PDSNs or other access network elements without any changes (new functionality or new configuration) to these network elements. This is due to the fact that, in this implementation, the accounting messages that are already sent between the point of attachment in the access network and the home network remote authentication server are used to implement the pre-paid functionality.

FIG. 5 shows how this embodiment of the invention restricts access to any data service when a pre-paid user has exceeded his/her pre-paid data usage quota. Steps a through d in FIG. 5 show how a user that is in the process of establishing a new data session is denied access to the system due to the fact that his/her pre-paid data usage quota has been exceeded. After the point of attachment 520 sends an access request to the home network remote authentication server 510, as shown in step a 541, the home network remote authentication server 510 authenticates the user, and then the PPC rejects this session because the pre-paid usage quota for this user has been exceeded. After the home network remote authentication server 510 sends an access request response rejecting the session to the point of attachment 520, as shown in step b 542, the point of attachment 520 sends a link control protocol (LCP) termination request to the MS 530, as shown in step c 543. The MS 530 then terminates the PPP session setup and, as shown in step d 544, sends an LCP acknowledge to the point of attachment 520. The PPP session terminates, as indicated by the bidirectional arrows 550 labeled "PPP Session Terminates."

As shown in FIG. 6, it is possible, in the context of this embodiment of the invention (PPC within the home network remote authentication server), to support termination of active data sessions when a pre-paid user exceeds his/her pre-paid data usage quota. The point of attachment will need to be configured to support session termination capabilities negotiation, such as defined by RADIUS STC [Type 26/88], and also support the Dynamic Authorization Extensions to Remote Authentication Dial In User Service (RFC 3576). For example, this is satisfied if the embodiment is implemented using RADIUS accounting messages as illustrated in FIG. 6. Session termination capability (STC) can be configured in a point of attachment to support the message sequence diagram shown in FIG. 6. Steps a through f illustrate a message sequence similar to that in FIG. 4. An access request is sent from the point of attachment 620 to the home network remote authentication server 610 (step a 641). The home network remote authentication server 610 sends an access request response to the point of attachment 620 (step b 642). If the access request response is an acceptance of service and not a rejection (which would be the case if the current prepaid subscriber has exceeded his pre-paid data usage limit), then a point-to-point protocol (PPP) session is established between the mobile station (MS) 630 and the point of attachment 620, as indicated by the bidirectional arrows 660 labeled "PPP Session Established." The point of attachment 620 sends an accounting request to (step c 643) and receives an accounting response (step d 644) from the home network remote authentication server 610. When the interval for point of attachment transmission of interim accounting records has elapsed, the point of attachment 620 sends another accounting request to the home network remote authentication server 610 (step e 645). The PPC then subtracts the input and output byte usage from the data usage quota for this prepaid user, and the home network remote authentication server 610 sends an accounting response to the point of attachment 620 (step f 646).

The main difference between the message sequence diagram in FIG. 6 and the message sequence diagram in FIG. 4 is in steps g through j. Here the PPC is capable of terminating the active user data session by using the Disconnect Request RADIUS message defined in RFC 3576 and supported by TIA-835-C. After the home network remote authentication server 610 receives an accounting request from the point of attachment 620, as shown in step g 647, the PPC determines that the data usage quota has been exceeded. The home network remote authentication server 610 then sends an accounting response and a disconnect request to the point of attachment 620, instructing the point of attachment 620 to terminate the user session, as shown in steps h 648 and i 649, respectively. The point of attachment 620 then sends a disconnect response to the home network remote authentication server 610 (step j 650) and an LCP termination request to the MS 630 (step k 651). The MS sends an LCP acknowledge to the point of attachment 620 (step l 652), and the PPP session terminates, as indicated by the bidirectional arrows 670 labeled as such.

The first embodiment of this invention is capable of being implemented in any home network that has an AAA server that uses RADIUS accounting messages. Therefore, CDMA and global system for mobile communications (GSM) home networks, for example, can benefit from this invention.

FIG. 7 illustrates a second embodiment of the present invention, wherein the PPC 710 is deployed in the MS 720. By deploying the PPC 710 functionality in the MS 720, the accounting messages, such as specific RADIUS messages defined in TIA-835-C, that would normally flow between the PPC 710 in the point of attachment 750 and the PPS 730 in the home network remote authentication server 740 now flow unchanged between the PPC 710 in the MS 720 and the PPS 730 in the home network remote authentication server 740. As the PPC 710 is deployed in the MS 720 in this embodiment, this implies that the MS 720 acts as a RADIUS network access server (NAS) client (as per RADIUS RFC 2865) and will require a RADIUS security association with the home network remote authentication server 740. The point of attachment 750 serves to connect the MS to the IP network 780. An added bonus of this deployment strategy is that the PPC 710 in the MS 720 will be able to provide the pre-paid user 760 real time status on the pre-paid data usage quota. The visited RADIUS server 770 is the RADIUS server that resides in the visited network.

Figure 8:
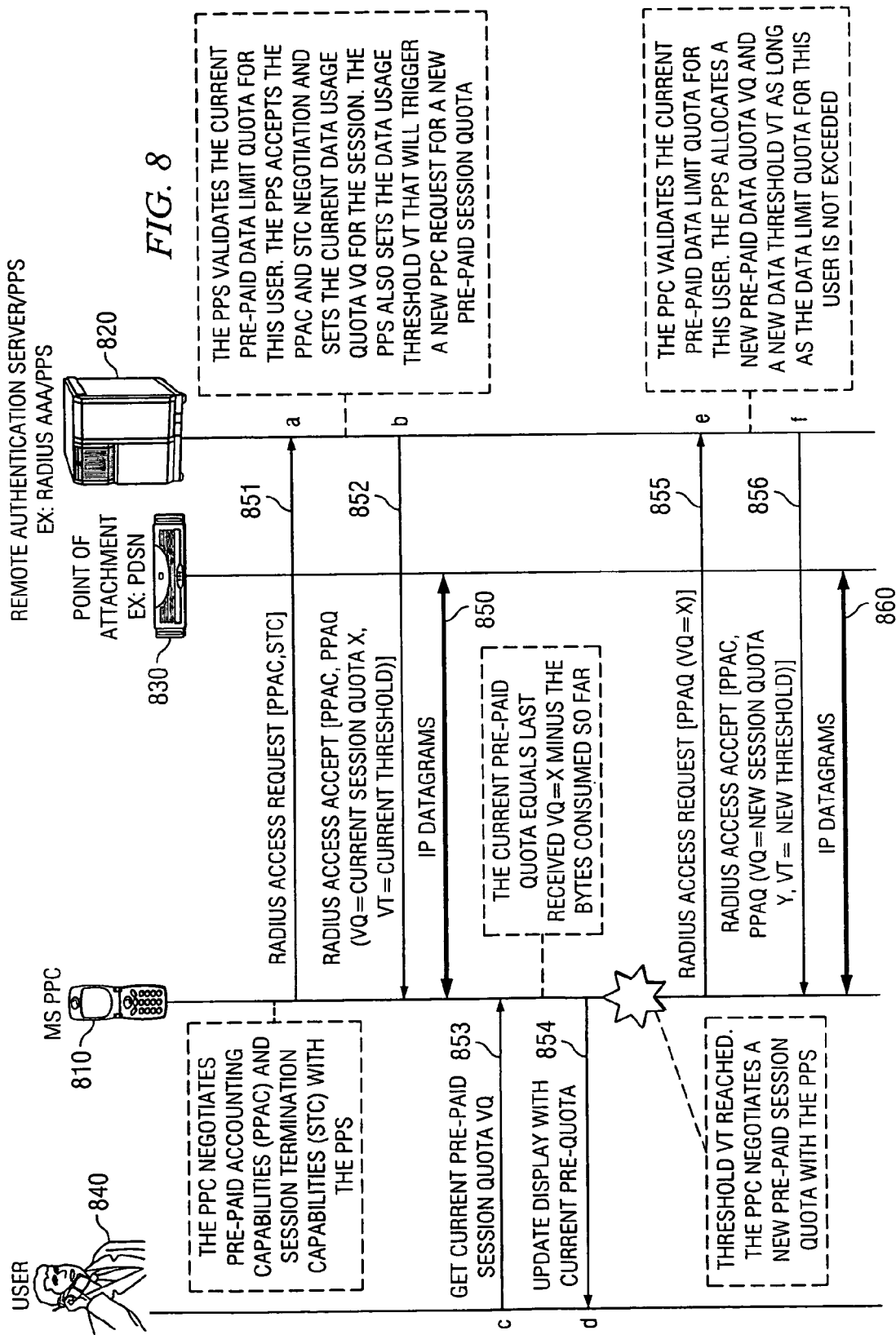
FIG. 8 is a diagram showing the message flow for the embodiment of the invention where the PPC is deployed within the mobile station.

An example of a message sequence according to the second embodiment of the invention is illustrated in FIG. 8, which shows the RADIUS messages specified in TIA-835-C used to provide pre-paid functionality. The exemplary messages illustrated in FIG. 8 comply with RFC 2865 Remote Authentication Dial In User Service (RADIUS)", RFC 2139/2866 "RADIUS Accounting", RFC 2869 "RADIUS Extensions." In step a 851, the MS 810, which deploys the PPC functionality, sends an access request to the home network remote authentication server 820. In sending this access request, the PPC negotiates the Pre-Paid Accounting Capability (PPAC) and the Session Termination Capability (STC) with the PPS, which may be incorporated into the home network remote authentication server 820. The PPS validates the current pre-paid data limit quota for the pre-paid user 840. The PPS accepts the PPAC and STC negotiation and sets the current data usage quota (VQ) for the session. The PPS also sets the data usage threshold (VT) that will trigger a new PPC request for a new pre-paid session quota.

In step b 852, the home network remote authentication server 820 sends an access request response to the PPC in the MS 810. The access request response contains the PPAC and the Pre-Paid Accounting Quota (PPAQ), comprising VQ and VT. At this point, data flow is enabled between the MS 810 and the point of attachment 830, as shown by the bidirectional arrow 850 in FIG. 8 labeled "IP Datagrams."

Steps c 853 and d 854 in FIG. 8 represent new functionality outside the scope of TIA-835-C. These steps illustrate the feature of providing the user 840 the ability to receive real-time feedback on the pre-paid quota status of his/her account. The MS 810 calculates the current pre-paid quota by subtracting the number of bytes consumed so far from the last received VQ. This functionality is not available today in either simple IP scenarios or in mobile IP scenarios as defined in TIA-835-C. This is because none of the standard deployment of PPC functionality in the network (in the point of attachment such as a PDSN or GGSN, the Home Agent (HA) or even the RADIUS AAA server) could provide the added benefit of allowing users to get feedback on the status of their pre-paid data usage. PPC functionality in the network would require a new scheme (new messages) to provide prepaid data usage quota status from the PPC back to the MS.

If the VT is reached, the PPC will negotiate a new pre-paid session quota with the PPS. In step e 855 in FIG. 8, the MS 810 deploying the PPC sends an access request to the home network remote authentication server 820. The access request contains the PPAQ in which the VQ is the value that it originally received in the previous access request response. Upon receiving this request, the PPS, which may be incorporated into the home network remote authentication server 820, validates the current pre-paid data limit quota for the user. The PPS allocates a new pre-paid data quota VQ and a new data threshold VT as long as the data limit for the user is not exceeded.

In step f 856, the home network remote authentication server 820 sends an access request response to the PPC in the MS 810. The access request response contains the PPAC and the PPAQ, comprising VQ and VT. At this point, data flow is enabled between the MS 810 and the point of attachment 830, as shown by the bidirectional arrow 860 labeled "IP Datagrams."

Because the pre-paid client is deployed within the MS in the second embodiment, this embodiment can be employed in a variety of types of homes networks, such as CDMA and GSM.

While the figures in this disclosure illustrating message sequences concern volume usage use cases, these embodiments of the invention can also be employed for duration usage use cases.

The description herein of embodiments of the invention often refers to the PPS as being corporated into the home network remote authentication server. However, it is possible for the PPS to be separate from the home network remote authentication server, there being a communication link between the home network remote authentication server and the PPS to handle pre-paid negotiations.

The foregoing is considered to be illustrative of the principles of the invention. Nothing in this specification should be construed to limit the scope of this invention to the specific examples and embodiments presented. Therefore, all suitable modifications and equivalents to this invention shall be deemed to fall within the scope of the invention.

We claim:

1. In a simple IP mobile network environment, a method for providing pre-paid data service to a roaming subscriber in a visited access network, said method comprising:
   deploying a Pre-Paid Client (PPC) at an Accounting Authentication Authorization (AAA) server associated with the roaming subscriber's home access network;
   providing, via the PPC deployed at the AAA server associated with the home access network, data metering for the pre-paid data service complying with a simple IP protocol;
   receiving an access request from a point of attachment in the visited access network capable of providing an IP network access to the AAA server associated with the roaming subscriber's home access network; and
   sending, to the point of attachment, an access request response from the AAA server associated with the roaming subscriber's home access network for providing the simple IP pre-paid data service to the roaming subscriber.

2. The method according to claim 1, wherein the point of attachment is a packet data service node.

3. The method according to claim 1, wherein the point of attachment is a WI-FI network node.

4. The method according to claim 1, wherein the point of attachment is a WiMAX network node.

5. The method according to claim 1, wherein a pre-paid server (PPS) is located within the AAA server associated with the roaming subscriber's home access network.

6. The method according to claim 1, wherein the access request response comprises: an interval for a transmission of interim accounting records from the point of attachment to the AAA server associated with the roaming subscriber's home access network and a total length of a data session.

7. The method according to claim 1, wherein the point of attachment supports session termination capability (STC).

8. The method according to claim 1, wherein messages between the point of attachment and the AAA server associated with the roaming subscriber's home access network comply with RFC 2139 and RFC 2865.

9. The method according to claim 8, wherein the messages further comply with RFC 2869.

10. The method according to claim 1, wherein the AAA server associated with the roaming subscriber's home access network is a Remote Authentication Dial In User Service (RADIUS) AAA server.

11. The method according to claim 1, wherein the home access network in which the AAA server resides is a CDMA network.

12. The method according to claim 1, wherein the home access network in which the AAA server resides is a GSM network.

13. The method of claim 1 wherein the access request response is configured to cause the point of attachment in the visited access network to provide simple IP pre-paid data service to the roaming subscriber independent from the visited network's capability to support PPC for simple IP pre-paid data roaming.

14. The method of claim 1 further comprising authorizing, at the PPC deployed at the AAA server associated with the roaming subscriber's home access network, the pre-paid data service for the roaming subscriber based on the roaming subscriber's pre-paid data usage quota.

15. A system for providing pre-paid simple IP data service to a roaming subscriber in a visited access network, said system comprising:

an Accounting Authentication Authorization (AAA) server associated with the roaming subscriber's home access network, the AAA server deploying a Pre-Paid Client (PPC) configured for providing data metering for the pre-paid data service complying with a simple IP protocol; and a point of attachment in the visited access network capable of providing an IP network access, wherein the point of attachment sends an access request to the AAA server associated with the roaming subscriber's home access network and receives an access request response for providing the simple IP pre-paid data service to the roaming subscriber.

16. The system according to claim 15, wherein the point of attachment is a packet data service node.

17. The system according to claim 15, wherein the point of attachment is a WIFI network node.

18. The system according to claim 15, wherein the point of attachment is a WiMAX network node.

19. The system according to claim 15, wherein a pre-paid server (PPS) is located within the AAA server associated with the roaming subscriber's home access network.

20. The system according to claim 15, wherein the AAA server associated with the roaming subscriber's home access network is a Remote Authentication Dial in User Service (RADIUS) server.

21. The system according to claim 15, wherein the home access network in which the AAA server resides is a CDMA network.

22. The system according to claim 15, wherein the home access network in which the AAA server resides is a GSM network.

23. The system according to claim 15, wherein the access request response comprises: an interval for a transmission of interim accounting records from the point of attachment to the AAA server associated with the roaming subscriber's home access network and a total length of a data session.

24. The system according to claim 15, wherein the point of attachment supports session termination capability (STC).

25. The system according to claim 15, wherein messages between the point of attachment and the AAA server associated with the roaming subscriber's home access network comply with RFC 2139 and RFC 2865.

26. The system according to claim 25, wherein the messages further comply with RFC 2869.

27. In a simple IP data network, a home network remote authentication server for providing a pre-paid data service comprising:

an Accounting Authentication Authorization (AAA) server associated with a first access network, the AAA server deploying a Pre-Paid Client (PPC) configured for providing data metering for the pre-paid data service complying with a simple IP protocol, the AAA server configured for receiving an access request from a point of attachment in a second access network and sending an access request response to the point of attachment for providing the simple IP pre-paid data service.

28. The home network remote authentication server according to claim 27, wherein the remote authentication server is a Remote Authentication Dial In User Service (RADIUS) AAA server.

29. The home network remote authentication server according to claim 27, wherein the remote authentication server incorporates a pre-paid server (PPS) functionality.

* * * * *